(12) United States Patent
Hong et al.

(10) Patent No.: US 12,306,873 B2
(45) Date of Patent: May 20, 2025

(54) DEVICE AND METHOD FOR GENERATING LOOK UP TABLE

(71) Applicants: Haining ESWIN IC Design Co., Ltd., Zhejiang (CN); Beijing ESWIN Computing Technology Co., Ltd., Beijing (CN)

(72) Inventors: Xingzhi Hong, Zhejiang (CN); Guang Tian, Zhejiang (CN)

(73) Assignees: Haining ESWIN IC Design Co., Ltd., Haining (CN); Beijing ESWIN Computing Technology Co., Ltd., Beijing (CN)

( * ) Notice: Subject to any disclaimer, the term of this patent is extended or adjusted under 35 U.S.C. 154(b) by 135 days.

(21) Appl. No.: 18/146,774

(22) Filed: Dec. 27, 2022

(65) Prior Publication Data

US 2024/0045906 A1 Feb. 8, 2024

(30) Foreign Application Priority Data

Aug. 5, 2022 (CN) .......................... 202210938321.0

(51) Int. Cl.
*G06F 16/901* (2019.01)
(52) U.S. Cl.
CPC .................................. *G06F 16/9017* (2019.01)
(58) Field of Classification Search
None
See application file for complete search history.

(56) References Cited

U.S. PATENT DOCUMENTS 10,890,490 B2 * 1/2021 Williams ............... H04N 23/23

FOREIGN PATENT DOCUMENTS

| CN | 201910666635 .8 | 11/2019 |
| CN | 201410064599 .5 | 10/2020 |

* cited by examiner

*Primary Examiner* — Amresh Singh

(57) ABSTRACT

The present application discloses a device and a method for generating a look up table, and relates to the technical field of look up tables. The device of the present application comprises: an acquisition unit configured for acquiring a plurality of target input values contained in each target dimension, wherein the target dimension is a dimension contained in a target look up table to be generated, and the number of the target dimensions is one or more; a determination unit configured for determining a target output value corresponding to each target input value contained in each of the target dimensions; a calculation unit configured for calculating a target difference value corresponding to each target input value contained in each of the target dimensions according to a preset rule, each target input value contained in each of the target dimensions and the target output value corresponding to each of the target input values; and a generation unit configured for generating the target look up table according to a mapping relationship between each target input value contained in each of the target dimensions and a target difference value corresponding thereto.

10 Claims, 2 Drawing Sheets

DEVICE AND METHOD FOR GENERATING LOOK UP TABLE

This application claims priority to Chinese Patent Application No. CN2022109383210, titled "DEVICE AND METHOD FOR GENERATING LOOK UP TABLE" and filed to the State Patent Intellectual Property Office on the entire contents of which are incorporated herein by reference.

TECHNICAL FIELD

The present application relates to the technical field of look up tables, and in particular to a device and a method for generating a look up table.

BACKGROUND ART

In the technical fields of image processing, video processing, communication, automatic driving, etc., when the mapping relationship between input values and output values cannot be represented by a function, or the function that represents the mapping relationship between input values and output values is relatively complex, a LUT (Look Up Table) is usually used for recording the mapping relationship between input values and output values. Therefore, the look up table is widely applied in the technical fields of image processing, video processing, communication, automatic driving, etc.

However, for accurate representation, the bit width occupied by each input value and the output value corresponding to each input value stored in the look up table is relatively large, so that make the data volume of the look up table is relatively large. It results in that a terminal instrument using the look up table needs a RAM and a SRAM with a relatively large storage capacity to store the look up tables, and thus leading to a relatively high manufacturing cost of the terminal instrument.

SUMMARY OF THE INVENTION

The embodiment of the present application provides a device and a method for generating a look up table, mainly aiming at reducing the data amount of the look up table, thereby reducing the manufacturing cost of a terminal instrument using the look up table.

In order to solve the above technical problems, the embodiment of the present application provides the following technical solutions.

In the first aspect, the present application provides a device for generating a look up table, wherein
the device is applied to a first terminal instrument, comprising:
an acquisition unit configured for acquiring a plurality of target input values contained in each target dimension, wherein the target dimension is a dimension contained in a target look up table to be generated, and the number of the target dimensions is one or more;
a determination unit configured for determining a target output value corresponding to each target input value contained in each of the target dimensions;
a calculation unit configured for calculating a target difference value corresponding to each target input value contained in each of the target dimensions according to a preset rule, each target input value contained in each of the target dimensions and the target output value corresponding to each of the target input values; and
a generation unit configured for generating the target look up table according to a mapping relationship between each target input value contained in each of the target dimensions and a target difference value corresponding thereto.

Optionally, the determination unit comprises at least one of:
a first calculation module configured for acquiring a target function corresponding to the target dimension, and calculating and obtaining a target output value corresponding to each of the target input values according to the target function and each target input value contained in the target dimension; and
a first determination module configured for acquiring a preset measurement output value corresponding to each target input value contained in the target dimension, and determining the preset measurement output value corresponding to each target input value contained in the target dimension as a target output value corresponding to each of the target input values.

Optionally, the calculation unit comprises:
a second determination module configured for determining a target prediction value corresponding to each target input value according to each target input value contained in the target dimension or the target output value corresponding to each of the target input values; and
a second calculation module configured for respectively calculating a difference value between the target output value corresponding to each of the target input values and the target prediction value so as to obtain a target difference value corresponding to each of the target input values.

Optionally, the second determination module is specifically configured for:
when the target input value is a first target input value among the plurality of target input values contained in the target dimension, determining a preset reference value as the target prediction value corresponding to the target input value; and
when the target input value is an $N^{th}$ target output value among the plurality of target input values contained in the target dimension, determining a target output value corresponding to a preamble target input value is determined as the target prediction value corresponding to the target input value, wherein the preamble target input value is an $(N-1)^{th}$ target input value among the plurality of target input values.

Optionally, the second determination module is specifically configured for:
acquiring a preset formula; and
calculating and obtaining a target prediction value corresponding to each of the target input values according to the preset formula and each target input value contained in the target dimension.

Optionally, the second determination module is specifically configured for:
determining each target input value contained in the target dimension as a target prediction value corresponding to each of the target input values.

Optionally, the device further comprises:
a transmitting unit configured for transmitting the preset rule and the target look up table to a second terminal instrument, so that after the second terminal instrument finds a target difference value corresponding to each look up input value in the target look up table according to the look up input value corresponding to each of the target dimensions, a target output value corresponding to each of the look up input values is calculated according to the preset rule, a plurality of the look up input values and the target difference value corresponding to each of the look up input values.

In the second aspect, the present application also provides a method for generating a look up table, wherein the method is applied to a first terminal instrument, comprising:

acquiring a plurality of target input values contained in each target dimension, wherein the target dimension is a dimension contained in a target look up table to be generated, and the number of the target dimensions is one or more;

determining a target output value corresponding to each target input value contained in each of the target dimensions;

calculating a target difference value corresponding to each target input value contained in each of the target dimensions according to a preset rule, each target input value contained in each of the target dimensions and the target output value corresponding to each of the target input values; and generating the target look up table according to a mapping relationship between each target input value contained in each of the target dimensions and a target difference value corresponding thereto.

Optionally, the determining a target output value corresponding to each target input value contained in each of the target dimensions comprises:

acquiring a target function corresponding to the target dimension, and calculating and obtaining a target output value corresponding to each of the target input values according to the target function and each target input value contained in the target dimension; or acquiring a preset measurement output value corresponding to each target input value contained in the target dimension, and determining the preset measurement output value corresponding to each target input value contained in the target dimension as a target output value corresponding to each of the target input values.

Optionally, the calculating a target difference value corresponding to each target input value contained in each of the target dimensions is calculated according to a preset rule, each target input value contained in each of the target dimensions and the target output value corresponding to each of the target input values comprises:

determining a target prediction value corresponding to each of the target input values according to each target input value contained in the target dimension or the target output value corresponding to each of the target input values; and respectively calculating a difference value between the target output value corresponding to each of the target input values and the target prediction value so as to obtain a target difference value corresponding to each of the target input values.

Optionally, the determining a target prediction value corresponding to each target input value according to each target input value contained in the target dimension or the target output value corresponding to each of the target input values comprises:

when the target input value is a first target input value among the plurality of target input values contained in the target dimension, determining a preset reference value as the target prediction value corresponding to the target input value; and when the target input value is an $N^{th}$ target output value among the plurality of target input values contained in the target dimension, determining a target output value corresponding to a preamble target input value as the target prediction value corresponding to the target input value, wherein the preamble target input value is an $(N-1)^{th}$ target input value among the plurality of the target input values.

Optionally, determining a target prediction value corresponding to each of the target input values according to each target input value contained in the target dimension or the target output value corresponding to each of the target input values comprises:

acquiring a preset formula; and calculating and obtaining a target prediction value corresponding to each of the target input values according to the preset formula and each target input value contained in the target dimension.

Optionally, determining a target prediction value corresponding to each of the target input values is determined according to each target input value contained in the target dimension or the target output value corresponding to each of the target input values comprises:

determining each target input value contained in the target dimension as a target prediction value corresponding to each of the target input values.

Optionally, the method further comprises:

transmitting the preset rule and the target look up table to a second terminal instrument, so that after the second terminal instrument finds a target difference value corresponding to each of the look up input values in the target look up table according to the look up input value corresponding to each of the target dimensions, the target output value corresponding to each of the look up input values is calculated according to the preset rule, a plurality of the look up input values and the target difference value corresponding to each of the look up input values.

In the third aspect, embodiment of the present application provides a storage medium, comprising a stored program, wherein the device where the storage medium is located is controlled to execute the method for generating a look up table of the second aspect when the program runs.

In the fourth aspect, embodiment of the present application provides a device for generating a look up table, wherein the device comprises a storage medium and one or more processors: the storage medium is coupled to the processors which are configured for executing program instructions stored in the storage medium; and the program instructions, when executed, perform the method for generating a look up table of the second aspect.

With the above technical solutions, the technical solutions provided by the present application have at least the following advantages.

The present application provides a device and a method for generating a look up table. The device for generating a look up table applied in the present application comprises an acquisition unit, a determination unit, a calculation unit and a generation unit. Firstly, the acquisition unit acquires a plurality of target input values contained in each target dimension preset by the worker in a first terminal instrument. Secondly, the determination unit determines a target output value corresponding to each target input value contained in each target dimension. Thirdly, the calculation unit calculates a target difference value corresponding to each target input value contained in each target dimension according to a preset rule, each target input value contained in each target dimension and the target output value corresponding to each target input value. Finally, the generation unit generates a target look up table according to a mapping relationship between each target input value contained in each target dimension and a target difference value corresponding thereto. In the present application, for any target input value, the numerical value of the target difference value corresponding to the target input value is smaller than that of the target output value corresponding to the target input value. Therefore, the bit width occupied by the target difference value corresponding to the target input value is smaller than that occupied by the target output value corresponding to the target input value. Thus, the data volume of the target look up table recorded with the mapping relationship between each target input value contained in each target dimension and the target difference value corresponding thereto is much smaller than that of the look up table recorded with the mapping relationship between each target input value contained in each target dimension and the target output value corresponding thereto, so that the terminal instrument using the target look up table may use the RAM and the SRAM with a smaller storage capacity to store the target look up table, thereby making it possible to effectively reduce the manufacturing cost of the terminal instrument using the target look up table.

The above description is merely an overview of the technical solution of the present application, which may be implemented according to the contents of the description in order to enable the technical means of the present application to be more clearly understood. Specific embodiments of the application are set forth below to enable the above and other objects, features and advantages of the present application to be more obvious and clearly understood.

BRIEF DESCRIPTION OF THE DRAWINGS

The above and other objects, features and advantages of exemplary embodiments of the present application will be easily understood by reading the detailed description below with reference to the accompanying drawings. In the drawings, a number of embodiments of the present application are illustrated in an exemplary rather than limiting manner, and the same or corresponding reference numerals indicate the same or corresponding parts, in which.

DETAILED DESCRIPTION OF THE INVENTION

Figure 1:
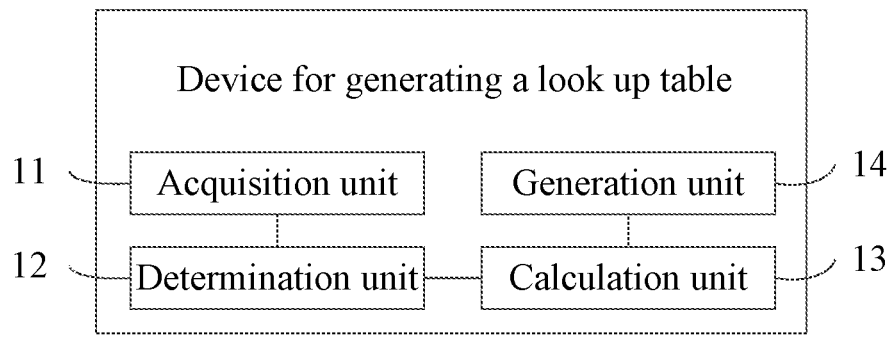
FIG. 1 shows a constitution block diagram of a device for generating a look up table provided by an embodiment of the present application.

Exemplary embodiments of the present application will be described in more detail below with reference to the accompanying drawings. Although exemplary embodiments of the application are shown in the drawings, it should be understood that the application can be embodied in various forms and should not be limited by the embodiments set forth here. On the contrary, these embodiments are provided to have a more thorough understanding of the application and to fully convey the scope of the application to those skilled in the art.

It should be noted that unless otherwise stated, the technical or scientific terms used herein shall have the ordinary meaning understood by those skilled in the art to which the application belongs.

The embodiment of the present application provides a device for generating a look up table, which is applied to a first terminal instrument, and the first terminal instrument can be but is not limited to computers, servers, etc. As shown in FIG. 1, the device specifically includes: an acquisition unit 11 configured for acquiring a plurality of target input values contained in each target dimension, wherein the target dimension is a dimension contained in a target look up table to be generated, and the number of the target dimensions is one or more; a determination unit 12 configured for determining a target output value corresponding to each target input value contained in each of the target dimensions; a calculation unit 13 configured for calculating a target difference value corresponding to each target input value contained in each of the target dimensions according to a preset rule, each target input value contained in each of the target dimensions and the target output value corresponding to each of the target input values; and a generation unit 14 configured for generating the target look up table according to a mapping relationship between each target input value contained in each of the target dimensions and a target difference value corresponding thereto.

A detailed process of generating a target look up table by the device for generating a look up table is described in detail below with reference to the device for generating a look up table shown in FIG. 1.

When the target look up table to be generated is a look up table applied in the field of image processing and specifically used for correcting a gray scale value of each pixel in a gray scale image, the target dimension is a gray scale dimension, and a plurality of target input values contained in the gray scale dimension are a plurality of gray scale values preset by the worker. When the target look up table to be generated is a look up table applied in image processing and specifically used for correcting a RGB value of each pixel in a color image, the target dimension is a red channel dimension, blue channel dimension and green channel dimension The plurality of target input values contained in the red channel dimension are a plurality of red values preset by the worker. The plurality of target input values contained in the blue channel dimension are a plurality of blue values preset by the worker. The plurality of target input values contained in the green channel dimension are a plurality of green values preset by the worker. When the target look up table to be generated is a look up table applied in the field of video processing and specifically used for correcting a gray scale value of each pixel in each frame of gray scale image contained in a video, the target dimension is a gray scale dimension, and a plurality of target input values contained in the gray scale dimension are a plurality of gray scale values preset by the worker. When the target look up table to be generated is a look up table applied in video processing and specifically used for correcting a RGB value of each pixel in a color image of each frame contained in the video, the target dimension is a red channel dimension, a blue channel dimension and a green channel dimension. The plurality of target input values contained in the red channel dimension are a plurality of red values preset by the worker. The plurality of target input values contained in the blue channel dimension are a plurality of blue values preset by the worker.

The plurality of target input values contained in the green channel dimension are a plurality of green values preset by the worker. When the target look up table to be generated is a transmission power applied in the field of communication and specifically used for compensating the output of a power amplifier in a terminal instrument, the target dimension is a transmission power dimension, and a plurality of target input values contained in the transmission power dimension are a plurality of transmission power values preset by the worker.

It should be noted that the number of target dimensions, the category of target dimensions and the value of the target input value contained in each target dimension in the target look up table mentioned in the above embodiment are just for convenience of expression. In the process of practical application, when the target look up table is applied in different technical fields, the number of target dimensions, the category of target dimensions and the value of the target input value contained in each target dimension in the target look up table will all be different. In the embodiment of the present application, there is no specific limitation on which technical field the target lookup table is specifically applied to, what target dimensions the target lookup table specifically contains, and what target input values each target dimension specifically contains.

In the embodiment of the present application, the worker needs to set one or more target dimensions contained in the target look up table to be generated in a first terminal instrument in advance, and set a plurality of target input values contained in each target dimension. When the target output value corresponding to each target input value contained in a certain target dimension can be obtained by function calculation, the worker also needs to set the target function corresponding to the target dimension in the first terminal instrument. When the target output value corresponding to each target input value contained in the certain target dimension cannot be obtained by function calculation, the worker needs to measure and obtain the measurement output value corresponding to each target input value contained in the target dimension, and set the measurement output value corresponding to each target input value contained in the target dimension in the first terminal instrument. When a target look up table needs to be generated, the worker can transmit a corresponding instruction to a device for generating a look up table via an input instrument of a first terminal instrument. After the device for generating a look up table receives the instruction input by the worker, the acquisition unit 11 in the device for generating a look up table acquires a plurality of target input values contained in each target dimension preset by the worker in the first terminal instrument. After the acquisition unit 11 obtains a plurality of target input values contained in each target dimension, the determination unit 12 can determine a target output value corresponding to each target input value contained in each target dimension.

That is, for any one target dimension, when a target function corresponding to the target dimension is set in the first terminal instrument, the target output value corresponding to each target input value contained in the target dimension is determined based on the target function corresponding to the target dimension. When a measurement output value corresponding to each target input value contained in the target dimension is set in the first terminal instrument, a target output value corresponding to each target input value contained in the target dimension is determined based on the measurement output value corresponding to each target input value contained in the target dimension. After the determination unit 12 determines a target output value corresponding to each target input value contained in each target dimension, the calculation unit 13 can calculate a target difference value corresponding to each target input value contained in each target dimension according to the preset rule, each target input value contained in each target dimension and a target output value corresponding to each target input value Herein, the preset rule is used to define how the calculation unit 13 calculates the target difference value corresponding to each target input value contained in each target dimension according to each target input value contained in each target dimension and the target output value corresponding to each target input value. The target difference value corresponding to any one of the target input values is a signed number. After the calculation unit 13 calculates the target difference value corresponding to each target input value contained in each target dimension according to the preset rule, each target input value contained in each target dimension and the target output value corresponding to each target input value, the generation unit 14 can generate a target look up table according to a mapping relationship between each target input value contained in each target dimension and the target difference value corresponding thereto.

The embodiment of the present application provides a device for generating a look up table, which includes an acquisition unit, a determination unit, a calculation unit and a generation unit. Firstly, the acquisition unit acquires a plurality of target input values contained in each target dimension preset by the worker in a first terminal instrument. Secondly, the determination unit determines a target output value corresponding to each target input value contained in each target dimension. Thirdly, the calculation unit calculates a target difference value corresponding to each target input value contained in each target dimension according to the preset rule, each target input value contained in each target dimension and the target output value corresponding to each target input value. Finally, the generation unit generates a target look up table according to a mapping relationship between each target input value contained in each target dimension and the target difference value corresponding thereto. In the embodiment of the present application, for any target input value, the numerical value of the target difference value corresponding to the target input value is smaller than that of the target output value corresponding to the target input value. Therefore, the bit width occupied by the target difference value corresponding to the target input value is smaller than that occupied by the target output value corresponding to the target input value. Thus, the data volume of the target look up table recorded with the mapping relationship between each target input value contained in each target dimension and the target difference value corresponding thereto is much smaller than that of the look up table recorded with the mapping relationship between each target input value contained in each target dimension and the target output value corresponding thereto, so that the terminal instrument using the target look up table may use the RAM and the SRAM with a smaller storage capacity to store the target look up table, thereby making it possible to effectively reduce the manufacturing cost of the terminal instrument using the target look up table.

Figure 2:
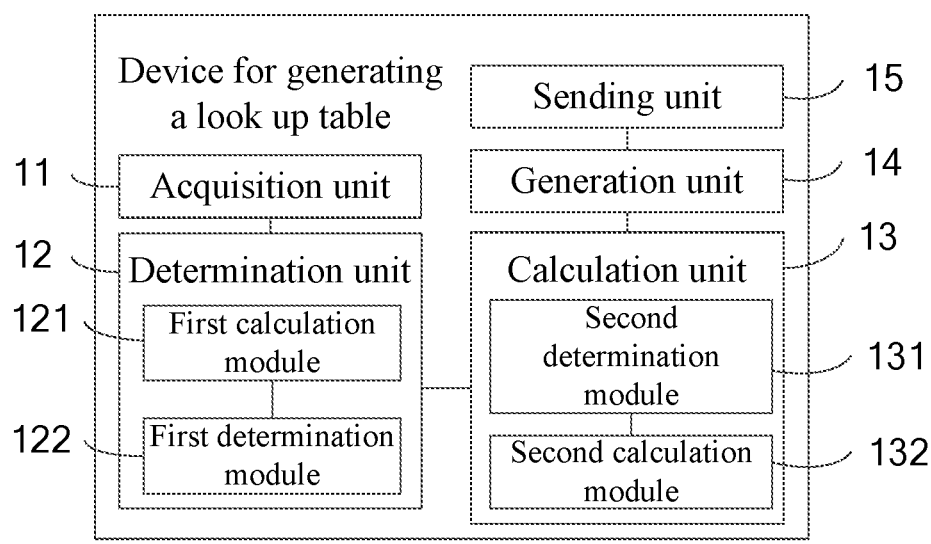
FIG. 2 shows a constitution block diagram of another device for generating a look up table provided by an embodiment of the present application.

The embodiment of the present application also provides another device for generating a look up table, which is applied to a first terminal instrument. As shown in FIG. 2, the explanation is as follows with the reference to FIG. 2.

Further, as shown in FIG. 2, the determination unit 12 includes a first calculation module 121 configured for acquiring the target function corresponding to the target dimension, and calculating and obtaining a target output value corresponding to each target input value according to the target function and each target input value contained in the target dimension; and a first determination module 122 configured for acquiring a preset measurement output value corresponding to each target input value contained in the target dimension, and determining the preset measurement output value corresponding to each target input value contained in the target dimension as a target output value corresponding to each target input value.

In the embodiment of the present application, the specific process of the determination unit 12 determining a target output value corresponding to each target input value contained in each target dimension is as follows. For any target dimension, when the target function corresponding to the target dimension is set in the first terminal instrument, the first calculation module 121 acquires the target function corresponding to the target dimension in the first terminal instrument, and calculates and obtains the target output value corresponding to each target input value contained in the target dimension according to the target function and each target input value contained in the target dimension, i.e., including firstly substituting the first target input value from the plurality of target input values contained in the target dimension into the target function to calculate and obtain the target output value corresponding to the first target input value; then substituting the second target input value from the plurality of target input values contained in the target dimension into the target function to calculate and obtain the target output value corresponding to the second target input value . . . ; finally substituting the last target input value from the plurality of target input values contained in the target dimension into the target function to calculate and obtain the target output value corresponding to the last target input value. When the preset measurement output value corresponding to each target input value contained in the target dimension is set in the first terminal instrument, the first determination module 122 acquires the preset measurement output value corresponding to each target input value contained in the target dimension in the first terminal instrument, and determines the preset measurement output value corresponding to each target input value contained in the target dimension as the target output value corresponding to each target input value, i.e., including determining the preset measurement output value corresponding to the first target input value from the plurality of target input values contained in the target dimension as the target output value corresponding to the first target input value, determining the preset measurement output value corresponding to the second target input value of a plurality of target input values contained in the target dimension as the target output value corresponding to the second target input value.

Further, as shown in FIG. 2, the calculation unit 13 includes a second determination module 131 configured for determining the target prediction value corresponding to each target input value according to each target input value contained in the target dimension or the target output value corresponding to each target input value; and the second calculation module 132 configured for respectively calculating the difference value between the target output value corresponding to each target input value and the target prediction value so as to obtain the target difference value corresponding to each target input value.

In the embodiment of the present application, the calculation unit 13 calculates the target difference value corresponding to each target input value contained in each target dimension according to the preset rule, each target input value contained in each target dimension and the target output value corresponding to each target input value, and the specific process is as follows. For any one target dimension, firstly, the second determination module 131 determines the target prediction value corresponding to each target input value contained in the target dimension according to each target input value contained in the target dimension or the target output value corresponding to each target input value. Then, the second calculation module 132 respectively calculates the difference value between the target output value corresponding to each target input value contained in the target dimension and the target prediction value, so as to obtain the target difference value corresponding to each target input value contained in the target dimension.

Further, as shown in FIG. 2, the second determination module 131 determines the target prediction value corresponding to each target input value contained in the target dimension according to each target input value contained in a certain target dimension or the target output value corresponding to each target input value, and the specific process is as follows:

when the certain target input value contained in the target dimension is the first target input value among the plurality of target input values contained in the target dimension, the preset reference value is determined as a target prediction value corresponding to the target input value, where the preset reference value is preset in the first terminal instrument by the worker; and when the certain target input value contained in the target dimension is the $N^{th}$ target output value among the plurality of target input values contained in the target dimension, the target output value corresponding to the preamble target input value is determined as the target prediction value corresponding to the target input value, where the preamble target input value is the $(N-1)^{th}$ target input value among the plurality of target input values contained in the target dimension, i.e., the target output value corresponding to the $(N-1)^{th}$ target input value is determined as a target prediction value corresponding to the $N^{th}$ target input value.

Further, as shown in FIG. 2, the second determination module 131 determines the target prediction value corresponding to each target input value contained in the target dimension according to each target input value contained in the certain target dimension or target output value corresponding to each target input value, and the specific process is as follows:

firstly, a preset formula is obtained, where the preset formula contains a plurality of target coefficients, and the preset formula is specifically as follows:

$$\text{base}(i) = a_0 + a_1 * i + a_2 * i^2 + \ldots + a_n * i^n$$

where base (i) is a target prediction value corresponding to the $i^{th}$ target input value, i is the $i^{th}$ target input value, $a_0, a_1, a_2, \ldots, a_n$ are a plurality of target coefficients, and the value of n is preset by a worker, which may be but is not limited to 10, 15, 20, etc.;

secondly, a target prediction value corresponding to each target input value is calculated and obtained according to a preset formula and each target input value contained in the target dimension, i.e., firstly a coefficient value corresponding to each target coefficient is determined according to the preset function approximation algorithm, where the preset function approximation algorithm may be but is not limited to a polynomial fitting algorithm, a Taylor expansion approximation algorithm, a Chebyshev polynomial algorithm, etc.; then coefficient values corresponding to each target coefficient is substituted into the preset formula to obtain a target formula; finally, each target input value contained in the target dimension is respectively substituted into a target formula so as to calculate and obtain a target prediction value corresponding to each target input value contained in the target dimension, i.e., including firstly substituting the first target input value of a plurality of target input values contained in the target dimension into the target formula so as to calculate and obtain a target prediction value corresponding to the first target input value, and then substituting the second target input value of a plurality of target input values contained in the target dimension into the target formula so as to calculate and obtain a target prediction value corresponding to the second target input value, . . . ; finally substituting the last target input value of a plurality of target input values contained in the target dimension into the target formula so as to calculate and obtain the target prediction value corresponding to the last target input value.

Further, as shown in FIG. 2, the second determination module 131 determines the target prediction value corresponding to each target input value contained in the target dimension according to each target input value contained in the certain target dimension or target output value corresponding to each target input value, and the specific process is as follows:

each target input value contained in the target dimension is determined as the target prediction value corresponding to each target input value contained in the target dimension, i.e., including determining the first target input value of a plurality of target input values contained in the target dimension as a target prediction value corresponding to the first target input value, determining the second target input value of a plurality of target input values contained in the target dimension as a target prediction value corresponding to the second target input value.

Further, as shown in FIG. 2, the device for generating a look up table further includes: a transmitting unit 15 configured for transmitting the preset rule and the target look up table to the second terminal instrument, so that after the second terminal instrument finds a target difference value corresponding to each look up input value in the target look up table according to the look up input value corresponding to each target dimension, a target output value corresponding to each look up input value is calculated according to the preset rule, a plurality of the look up input values and the target difference value corresponding to each look up input value.

In the embodiment of the present application, after the generation unit 14 generates a target look up table according to the mapping relationship between each target input value contained in each target dimension and a target difference value corresponding thereto, the transmitting unit 15 may transmit the preset rule and the target look up table to the second terminal instrument, so that after the second terminal instrument searches and obtains the target difference value (i.e. for a search input value corresponding to any one of the target dimension, the target difference value corresponding to the target input value with the same value as the search input value contained in the target dimension and recorded in the target search table is determined as the target difference value corresponding to the search input value), the target output value corresponding to each search input value is calculated according to the preset rule, a plurality of search input values and the target difference value corresponding to each search input value. That is, it is determined how the calculation unit 13 in the device for generating a search table according to the preset rule calculates the target difference value corresponding to each target input value contained in each target dimension according to each target input value contained in each target dimension and the target output value corresponding to each target input value, so as to determine how to calculate the target output value corresponding to each search input value according to a plurality of search input values and the target difference value corresponding to each search input value, wherein the second terminal instrument is connected to the first terminal instrument via a network or a data line, and the second terminal instrument is a terminal instrument needing to use a target search table.

It should be noted that the modules and units described above maybe implemented by any one of hardware, firmware or software, or a combination thereof. For example, the modules and units can all be implemented by hardware, for example implemented by circuit. Or, in some embodiments, all the modules and units can be implemented by software as program modules or set of instructions. Therefore, the apparatus as a whole may be implemented as programs stored in a non-transitory memory. Or, in some embodiments, according to application scenarios, parts of the modules and units can be implemented by software and parts of the modules and units can be implemented by hardware or firmware. In that case, the apparatus as a whole may be implemented as a device with hardware (circuit) and storage medium.

Figure 3:
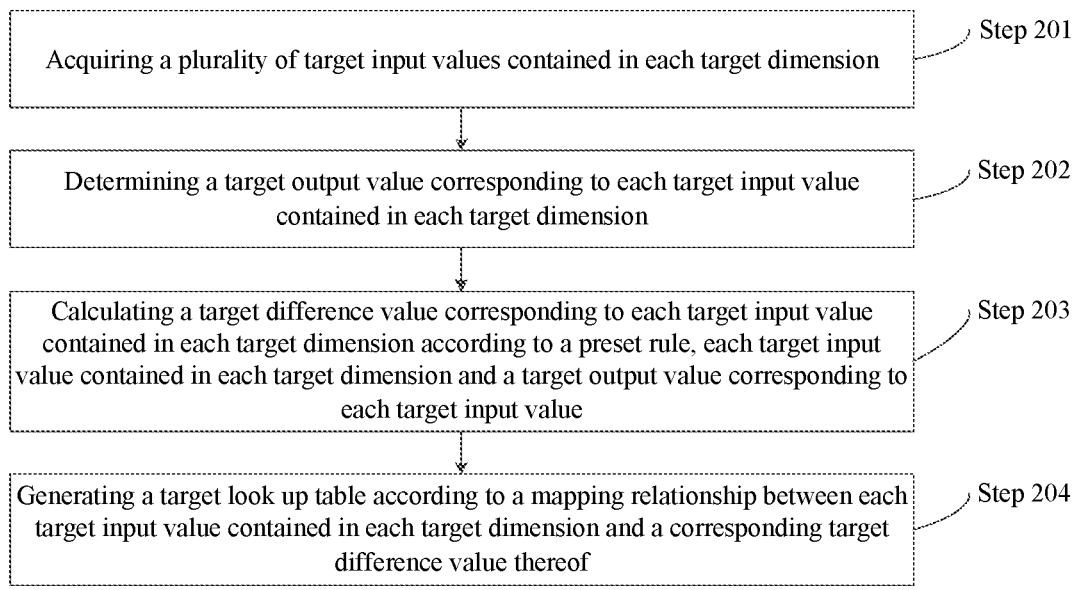
FIG. 3 shows a flowchart of a method for generating a look up table provided by an embodiment of the present application.

Further, as an implementation of the above-mentioned device shown in FIGS. 1 and 2, another embodiment of the present application also provides a method for generating a look up table, which is applied to the first terminal instrument. The first terminal instrument can be but is not limited to computers, servers, etc. The embodiment of the method corresponds to the embodiment of the device described above. The details of the embodiment of the device described above will not be repeated in the embodiment of the method for convenient reading. However, it should be clear that the method of the embodiment may correspond to all the contents of the embodiment of the device described above. The method is applied to reduce the data amount of the look up table thereby reduce the manufacturing cost of a terminal instrument using the look up table, and specifically as shown in FIG. 3, the method includes step 201-step 204:

step 201, obtaining a plurality of target input values contained in each target dimension;

where the target dimension is a dimension contained in a target look up table to be generated, and the number of target dimensions is one or more;

step 202, determining the target output value corresponding to each target input value contained in each target dimension;

step 203, calculating the target difference value corresponding to each target input value contained in each target dimension according to the preset rule, each target input value contained in each target dimension and the target output value corresponding to each target input value;

step 204, generating the target look up table according to the mapping relationship between each target input value contained in each target dimension and the corresponding target difference value thereof.

Further, in step 202, the determining the target output value corresponding to each target input value contained in each target dimension includes:

acquiring the target function corresponding to the target dimension, and calculating and obtaining the target output value corresponding to each target input value according to the target function and each target input value contained in the target dimension; or acquiring a preset measurement output value corresponding to each target input value contained in the target dimension, and determining the preset measurement output value corresponding to each target input value contained in the target dimension as the target output value corresponding to each target input value.

Further, in step 203, the calculating the target difference value corresponding to each target input value contained in each target dimension according to the preset rule, each target input value contained in each target dimension and the target output value corresponding to each target input value includes:

determining the target prediction value corresponding to each target input value according to each target input value contained in the target dimension or the target output value corresponding to each target input value; and respectively calculating the difference value between the target output value corresponding to each target input value and the target prediction value to obtain the target difference value corresponding to each target input value.

Further, determining the target prediction value corresponding to each target input value according to each target input value contained in the target dimension or the target output value corresponding to each target input value, including:

when the target input value is a first target input value among the plurality of target input values contained in the target dimension, determining a preset reference value as the target prediction value corresponding to the target input value; and when the target input value is an $N^{th}$ target output value among the plurality of target input values contained in the target dimension, determining a target output value corresponding to a preamble target input value is determined as the target prediction value corresponding to the target input value, wherein the preamble target input value is an $(N-1)^{th}$ target input value among the plurality of target input values.

Further, determining the target prediction value corresponding to each target input value according to each target input value contained in the target dimension or the target output value corresponding to each target input value, including:

acquiring a preset formula; and calculating and obtaining a target prediction value corresponding to each of the target input values according to the preset formula and each target input value contained in the target dimension.

Further, determining the target prediction value corresponding to each target input value according to each target input value contained in the target dimension or the target output value corresponding to each target input value, including:

determining each target input value contained in the target dimension as the target prediction value corresponding to each target input value.

Further, the method further includes:

transmitting the preset rule and the target look up table to the second terminal instrument, so that after the second terminal instrument finds a target difference value corresponding to each look up input value in the target look up table according to the look up input value corresponding to each target dimension, a target output value corresponding to each look up input value is calculated according to the preset rule, a plurality of look up input values and the target difference value corresponding to each look up input value.

The embodiment of the present application provides a device and a method for generating a look up table. The device for generating a look up table applied in the present application includes an acquisition unit, a determination unit, a calculation unit and a generation unit. Firstly, the acquisition unit acquires a plurality of target input values contained in each target dimension preset by a worker in a first terminal instrument; secondly, a determination unit determines a target output value corresponding to each target input value contained in each target dimension; thirdly, a calculation unit calculates a target difference value corresponding to each target input value contained in each target dimension according to a preset rule, each target input value contained in each target dimension and a target output value corresponding to each target input value; finally, a generation unit generates a target look up table according to a mapping relationship between each target input value contained in each target dimension and a target difference value corresponding thereto. In the present application, for any target input value, the numerical value of the target difference value corresponding to the target input value is smaller than that of the target output value corresponding to the target input value. Therefore, the bit width occupied by the target difference value corresponding to the target input value is smaller than that occupied by the target output value corresponding to the target input value. Thus, the data volume of the target look up table recorded with the mapping relationship between each target input value contained in each target dimension and the target difference value corresponding thereto is much smaller than that of the look up table recorded with the mapping relationship between each target input value contained in each target dimension and the target output value corresponding thereto, so that the terminal instrument using the target look up table may use the RAM and the SRAM with a smaller storage capacity to store the target look up table, thereby making it possible to effectively reduce the manufacturing cost of the terminal instrument using the target look up table.

The embodiment of the present application provides a storage medium, including a stored program, wherein the device where the storage medium is located is controlled to execute the above-mentioned method for generating a look up table when the program runs.

The storage medium may include a form of non-persistent memory, random access memory (RAM), and/or non-volatile memory, such as read only memory (ROM) or flash memory (flash RAM), in a computer readable medium, the memory including at least one memory chip.

The embodiments of the present application also provide a device for generating a look up table, the device including a storage medium; and one or more processors, the storage medium coupled to the processors which are configured for executing program instructions stored in the storage medium; the program instructions, when executed, perform the method of generating a look up table described above.

An embodiment of the present application provides a device, the device including a processor, a memory and a program stored in the memory and executable on the processor, wherein when the processor executes the program, the following steps are implemented:

acquiring a plurality of target input values contained in each target dimension, wherein the target dimension is a dimension contained in a target look up table to be generated, and the number of the target dimensions is one or more;

determining a target output value corresponding to each target input value contained in each of the target dimensions;

calculating a target difference value corresponding to each target input value contained in each of the target dimensions according to a preset rule, each target input value contained in each of the target dimensions and the target output value corresponding to each of the target input values; and generating the target look up table according to the mapping relationship between each target input value contained in each target dimension and the target difference value corresponding thereto.

Further, the determining a target output value corresponding to each target input value contained in each of the target dimensions includes:

acquiring a target function corresponding to the target dimension, and calculating and obtaining a target output value corresponding to each of the target input values according to the target function and each target input value contained in the target dimension; or acquiring a preset measurement output value corresponding to each target input value contained in the target dimension, and determining the preset measurement output value corresponding to each target input value contained in the target dimension as a target output value corresponding to each of the target input values.

Further, the calculating a target difference value corresponding to each target input value contained in each of the target dimensions is calculated according to a preset rule, each target input value contained in each of the target dimensions and the target output value corresponding to each of the target input values includes:

determining a target prediction value corresponding to each target input value according to each target input value contained in the target dimension or the target output value corresponding to each of the target input values; and respectively calculating a difference value between the target output value corresponding to each of the target input values and the target prediction value so as to obtain a target difference value corresponding to each of the target input values.

Further, the determining a target prediction value corresponding to each target input value according to each target input value contained in the target dimension or a target output value corresponding to each of the target input values includes:

when the target input value is a first target input value among the plurality of target input values contained in the target dimension, determining a preset reference value as the target prediction value corresponding to the target input value; and when the target input value is an $N^{th}$ target output value among the plurality of target input values contained in the target dimension, determining a target output value corresponding to a preamble target input value is determined as the target prediction value corresponding to the target input value, wherein the preamble target input value is an $(N-1)^{th}$ target input value among the plurality of target input values.

Further, the determining a target prediction value corresponding to each target input value according to each target input value contained in the target dimension or a target output value corresponding to each of the target input values includes:

acquiring a preset formula; and calculating and obtaining a target prediction value corresponding to each of the target input values according to the preset formula and each target input value contained in the target dimension.

Further, the determining a target prediction value corresponding to each target input value according to each target input value contained in the target dimension or a target output value corresponding to each of the target input values includes:

determining each target input value contained in the target dimension as a target prediction value corresponding to each of the target input values.

Further, the method further includes:

transmitting the preset rule and the target look up table to a second terminal instrument, so that after the second terminal instrument finds a target difference value corresponding to each look up input value in the target look up table according to the look up input value corresponding to each of the target dimensions, a target output value corresponding to each of the look up input values is calculated according to the preset rule, a plurality of the look up input values and the target difference value corresponding to each of the look up input values.

The present application also provides a computer program product. When executed on a data processing device, the computer program product is suitable for executing initialization of the program codes including following method steps: acquiring a plurality of target input values contained in each target dimension, wherein the target dimension is a dimension contained in a target look up table to be generated, and the number of the target dimensions is one or more; determining a target output value corresponding to each target input value contained in each of the target dimensions; calculating a target difference value corresponding to each target input value contained in each of the target dimensions according to a preset rule, each target input value contained in each of the target dimensions and the target output value corresponding to each of the target input values; and generating the target look up table according to a mapping relationship between each target input value contained in each of the target dimensions and a target difference value corresponding thereto.

It should be understood by those skilled in the art that the embodiments of the present application can be provided as methods, systems, or computer program products. Therefore, the present application may take the form of an entirely hardware embodiment, an entirely software embodiment or an embodiment combining software and hardware. Furthermore, the present application may take the form of a computer program product implemented on one or more computer usable storage media (including but not limited to magnetic disk storage, CD-ROM, optical storage, etc.) having computer usable program codes embodied therein.

The present application is described with reference to flowcharts and/or block diagrams of methods, devices (systems), and computer program products according to embodiments of the present application. It should be understood that each flow and/or block of the flowcharts and/or block diagrams, and combinations of flows and/or blocks of the flowcharts and/or block diagrams may be implemented by computer program instructions. These computer program instructions may be provided to a processor of general-purpose computers, special-purpose computers, embedded processors, or other programmable data processing instruments to produce a machine, so that the instructions executed via the processor of the computers or other programmable data processing instruments create means for implementing the functions specified in one or more flows of the flowcharts and/or one or more blocks of the diagram blocks.

These computer program instructions may also be stored in a computer-readable memory that may direct computers or other programmable data processing instruments to function in a particular manner, so that the instructions stored in the computer-readable memory produce an article of manufacture including instruction means which implement the function specified in one or more flows of the flowcharts and/or one or more blocks of the block diagrams.

These computer program instructions may also be loaded on computers or other programmable data processing instruments, so that a series of operational steps are executed on computers or other programmable instruments to produce a computer-implemented process, so that the instructions executed on computers or other programmable instruments provide steps for implementing the functions specified in one or more flows of the flowcharts and/or one or more blocks of the block diagrams.

In a typical configuration, a computing instrument includes one or more processors (CPUs), input/output interfaces, network interfaces, and memory.

Memory may include forms of volatile memory, random access memory (RAM), and/or nonvolatile memory in computer-readable media, such as read-only memory (ROM) or flash memory (flash RAM). Memory is an example of a computer-readable medium.

Computer-readable media, including permanent and non-permanent, removable and non-removable media, can implement information storage by any method or technology. Information may be computer readable instructions, data structures, modules of programs, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, CD read-only memory (CD-ROM), digital versatile disc (DVD) or other optical storage, magnetic cassettes, tape magnetic disk storage or other magnetic storage instruments or any other non-transmission medium, which may be used to store information that may be accessed by computing instruments. As defined herein, the computer-readable media do not include a transitory media, such as modulated data signals and carrier waves.

It should also be noted that the terms "comprises", "comprising", or any other variation thereof are intended to cover a non-exclusive inclusion. Therefore, processes, methods, commodities, or instruments that include a series of elements may include not only those elements but include other elements not explicitly listed or also include elements inherent to such processes, methods, commodities, or instruments. Without further restrictions, the element defined by the statement "comprising one . . . " does not exclude the existence of another identical element in the processes, methods, commodities, or instruments that includes the element.

It should be understood by those skilled in the art that the embodiments of the present application can be provided as methods, systems, or computer program products. Therefore, the present application may take the form of an entirely hardware embodiment, an entirely software embodiment or an embodiment combining software and hardware. Furthermore, the present application may take the form of a computer program product implemented on one or more computer usable storage media (including but not limited to magnetic disk storage, CD-ROM, optical storage, etc.) having computer usable program codes embodied therein.

The above are only embodiments of the present application, and are not intended to limit the present application. For those skilled in the art, various modifications and variations can be made in the present application. Any modification, equivalent substitution, improvement, etc. made within the spirit and principle of the application should be included in the scope of the claims of the application.

The invention claimed is:

1. A device for generating a look up table, wherein the device is applied to a first terminal instrument, comprising a processor;
   the processor is configured for acquiring a plurality of target input values contained in each target dimension, wherein the target dimension is a dimension contained in a target look up table to be generated, and the number of the target dimensions is one or more;
   determining a target output value corresponding to each target input value contained in each of the target dimensions;
   calculating a target difference value corresponding to each target input value contained in each of the target dimensions according to a preset rule, each target input value contained in each of the target dimensions and the target output value corresponding to each of the target input values; and
   generating the target look up table according to a mapping relationship between each target input value contained in each of the target dimensions and a target difference value corresponding thereto;
   the processor is specifically configured for determining a target prediction value corresponding to each target input value according to each target input value contained in the target dimension or the target output value corresponding to each of the target input values; and respectively calculating a difference value between the target output value corresponding to each of the target input values and the target prediction value so as to obtain a target difference value corresponding to each of the target input values;
   the processor is specifically configured for,
   when the target input value is a first target input value among the plurality of target input values contained in the target dimension, determining a preset reference value as the target prediction value corresponding to the target input value; and
   when the target input value is an $N^{th}$ target output value among the plurality of target input values contained in the target dimension, determining a target output value corresponding to a preamble target input value as the target prediction value corresponding to the target input value, wherein the preamble target input value is an $(N-1)^{th}$ target input value among the plurality of target input values; and the processor is further configured for transmitting the preset rule and the target look up table to a second terminal instrument, so that after the second terminal instrument finds a target difference value corresponding to each look up input value in the target look up table according to the look up input value corresponding to each of the target dimensions, a target output value corresponding to each of the look up input values is calculated according to the preset rule, a plurality of the look up input values and the target difference value corresponding to each of the look up input values.

2. The device according to claim 1, wherein, the processor is specifically configured for acquiring a target function corresponding to the target dimension, and calculating and obtaining a target output value corresponding to each of the target input values according to the target function and each target input value contained in the target dimension;

or acquiring a preset measurement output value corresponding to each target input value contained in the target dimension, and determining the preset measurement output value corresponding to each target input value contained in the target dimension as a target output value corresponding to each of the target input values.

3. The device according to claim 1, wherein the processor is specifically configured for acquiring a preset formula; and calculating and obtaining a target prediction value corresponding to each of the target input values according to the preset formula and each target input value contained in the target dimension.

4. The device according to claim 1, wherein the processor is specifically configured for determining each target input value contained in the target dimension as a target prediction value corresponding to each of the target input values.

5. A method for generating a look up table, wherein the method is applied to a first terminal instrument, comprising:

acquiring a plurality of target input values contained in each target dimension, wherein the target dimension is a dimension contained in a target look up table to be generated, and the number of the target dimensions is one or more;

determining a target output value corresponding to each target input value contained in each of the target dimensions;

calculating a target difference value corresponding to each target input value contained in each of the target dimensions according to a preset rule, each target input value contained in each of the target dimensions and the target output value corresponding to each of the target input values; and generating the target look up table according to a mapping relationship between each target input value contained in each of the target dimensions and a target difference value corresponding thereto;

wherein the calculating a target difference value corresponding to each target input value contained in each of the target dimensions is calculated according to a preset rule, each target input value contained in each of the target dimensions and the target output value corresponding to each of the target input values comprises:

determining a target prediction value corresponding to each of the target input values according to each target input value contained in the target dimension or the target output value corresponding to each of the target input values;

respectively calculating a difference value between the target output value corresponding to each of the target input values and the target prediction value so as to obtain a target difference value corresponding to each of the target input values;

the determining a target prediction value corresponding to each target input value according to each target input value contained in the target dimension or a target output value corresponding to each of the target input values comprises:

when the target input value is a first target input value among the plurality of target input values contained in the target dimension, determining a preset reference value as the target prediction value corresponding to the target input value; and when the target input value is an $N^{th}$ target output value among the plurality of target input values contained in the target dimension, determining a target output value corresponding to a preamble target input value as the target prediction value corresponding to the target input value, wherein the preamble target input value is an $(N-1)^{th}$ target input value among the plurality of the target input values;

the method further comprises:

transmitting the preset rule and the target look up table to a second terminal instrument, so that after the second terminal instrument finds a target difference value corresponding to each of the look up input values in the target look up table according to the look up input value corresponding to each of the target dimensions, a target output value corresponding to each of the look up input values is calculated according to the preset rule, a plurality of the look up input values and the target difference value corresponding to each of the look up input values.

6. The method according to claim 5, wherein the determining a target output value corresponding to each target input value contained in each of the target dimensions comprises:

acquiring a target function corresponding to the target dimension, and calculating and obtaining a target output value corresponding to each of the target input values according to the target function and each target input value contained in the target dimension; or acquiring a preset measurement output value corresponding to each target input value contained in the target dimension, and determining the preset measurement output value corresponding to each target input value contained in the target dimension as a target output value corresponding to each of the target input values.

7. The method according to claim 5, wherein the determining a target prediction value corresponding to each of the target input values according to each target input value contained in the target dimension or a target output value corresponding to each of the target input values comprises:

acquiring a preset formula; and calculating and obtaining a target prediction value corresponding to each of the target input values according to the preset formula and each target input value contained in the target dimension.

8. The method according to claim 5, wherein the determining a target prediction value corresponding to each of the target input values is determined according to each target input value contained in the target dimension or the target output value corresponding to each of the target input values comprises:

determining each target input value contained in the target dimension as a target prediction value corresponding to each of the target input values.

9. A non-transitory storage medium, comprising a stored program, wherein the device where the non-transitory storage medium is located is controlled to execute the method for generating a look up table of claim 5 when the program runs.

10. A device for generating a look up table, wherein the device comprises a storage medium and one or more processors; the storage medium is coupled to the processors which are configured for executing program instructions stored in the storage medium; and the program instructions, when executed, perform the method for generating a look up table of claim 5.

* * * * *